(12) United States Patent
Lee et al.

(10) Patent No.: US 10,850,533 B2
(45) Date of Patent: Dec. 1, 2020

(54) IMAGE FORMING APPARATUS

(71) Applicant: TOSHIBA TEC KABUSHIKI KAISHA, Tokyo (JP)

(72) Inventors: Men Hwa Lee, Singapore (SG); Noriyuki Watanabe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/414,830

(22) Filed: May 17, 2019

(65) Prior Publication Data

US 2019/0358962 A1    Nov. 28, 2019

(30) Foreign Application Priority Data

May 22, 2018   (JP) ................................ 2018-098144

(51) Int. Cl.
| | | |
|---|---|---|
| *B41J 2/335* | (2006.01) | |
| *B41J 2/355* | (2006.01) | |
| *B41J 29/393* | (2006.01) | |
| *G06Q 20/20* | (2012.01) | |

(52) U.S. Cl.
CPC ......... *B41J 2/3558* (2013.01); *B41J 2/33515* (2013.01); *B41J 2/3553* (2013.01); *B41J 29/393* (2013.01); *G06Q 20/20* (2013.01)

(58) Field of Classification Search
CPC .... B41J 2/33515; B41J 2/3553; B41J 29/393; B41J 2/3558; G06Q 20/20
See application file for complete search history.

(56) References Cited

U.S. PATENT DOCUMENTS

| | | | |
|---|---|---|---|
| 10,046,582 B2 * | 8/2018 | Kyoso | ...................... B41J 29/38 |
| 10,311,561 B2 * | 6/2019 | Ukishima | ............ G06K 9/6202 |
| 2011/0199426 A1 | 8/2011 | Kuroda | |
| 2019/0009570 A1 * | 1/2019 | Burton | ................... B41J 2/2142 |

FOREIGN PATENT DOCUMENTS

JP    2010-149488    7/2010

* cited by examiner

*Primary Examiner* — Lamson D Nguyen
(74) *Attorney, Agent, or Firm* — Amin, Turocy & Watson, LLP

(57) ABSTRACT

In accordance with an embodiment, an image forming apparatus comprises a thermal head including a plurality of heat generation elements and configured to form an image on a sheet using heat generated by the heat generation element; a health check section configured to diagnose conditions of the heat generation elements; and a control section configured to control the health check section to execute a health check processing when the thermal head is not executing a job of forming an image and diagnose conditions of remaining heat generation elements in a next health check processing when the health check processing is interrupted.

20 Claims, 8 Drawing Sheets

IMAGE FORMING APPARATUS

CROSS-REFERENCE TO RELATED APPLICATION

This application is based upon and claims the benefit of priority from Japanese Patent Application No. 2018-098144, filed on May 22, 2018, the entire contents of which are incorporated herein by reference.

FIELD

Embodiments described herein relate generally to an image forming apparatus, POS systems, and diagnostic methods related thereto.

BACKGROUND

A POS (Point of Sales) system that manages a retail store such as a supermarket includes a plurality of POS terminals connected to a network. The POS terminal is installed at, for example, a register counter, and performs registration of a commodity that a customer wants to purchase and settlement of a purchase amount. The POS terminal is connected to a POS printer via a USB (Universal Serial Bus) cable, for example. The POS printer issues a receipt on which details of a commodity after the settlement are recorded.

Many POS printers are thermal printers. The thermal printer includes a thermal head in which a plurality of heat generation elements for forming dots is arranged. The decline in the condition of the heat generation element affects printing. In particular, if a disconnection occurs in the heat generation element, a dot is lacking and the printing is disordered. Therefore, diagnosis about whether abnormality has occurred in the thermal head is executed, for example, by an operator such as a store clerk inputting a command or is executed in an off-line mode.

However, the POS printer maintains an online state with the POS terminal in order to provide services to a customer during business time of the retail store. Therefore, a user of the POS printer, i.e., a store clerk or a customer often knows afterwards that the abnormality has occurred in the thermal head after a receipt of which printing is disordered is issued.

DETAILED DESCRIPTION

Figure 1:
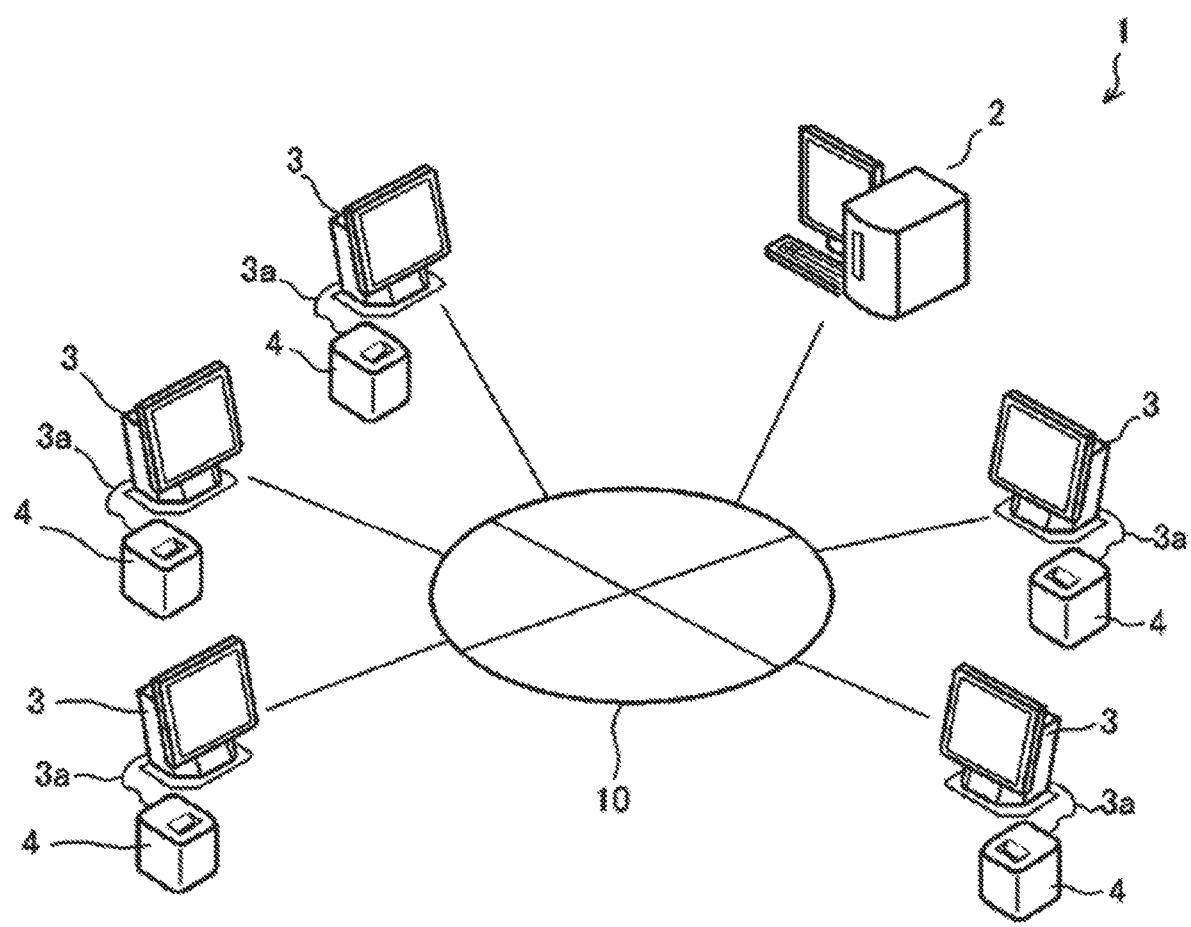
FIG. 1 is a diagram illustrating an overall configuration of a POS system provided with POS printers according to a first embodiment.

In accordance with an embodiment, an image forming apparatus comprises a thermal head including a plurality of heat generation elements and configured to form an image on a sheet using heat generated by the heat generation element; a health check section configured to diagnose conditions of the heat generation elements; and a control section configured to control the health check section to execute a health check processing when the thermal head is not executing a job of forming an image and diagnose conditions of remaining heat generation elements in a next health check processing when the health check processing is interrupted.

First Embodiment

Hereinafter, a POS system 1 provided with a thermal printer which is an example of an image forming apparatus according to an embodiment is described in detail with reference to the accompanying drawings. In each drawing, the same components are denoted with the same reference numerals.

FIG. 1 is a diagram illustrating an overall configuration of the POS system 1 that manages a retail store such as a supermarket. The POS system 1 includes a POS server 2 connected to a network 10. The POS server 2 centrally manages information relating to commodities sold in the retail store. The POS system 1 includes a plurality of POS terminals 3 connected to the network 10. The POS terminal 3 is, for example, a terminal-type POS terminal 3 installed in a register counter. The POS terminal 3 registers commodities that a customer wants to purchase in order and performs settlement on a purchase amount after registration of all the commodities by an operation performed by a store clerk. Alternatively, the customer may perform registration and settlement on the commodities by himself/herself according to a self-service system.

The POS printer 4 issues a receipt after settlement of the purchase amount of the commodity. The POS printer 4 is an example of a thermal printer. The POS printer 4 is connected to the POS terminal 3 via a communication cable 3a such as a USB cable. Alternatively, the POS terminal 3 and the POS printer 4 may be integrally formed by incorporating a printer function into a main body portion of the POS terminal 3. The POS printer 4 executes a printing job to print a receipt based on the information of the printing job received from the POS terminal 3.

Figure 2:
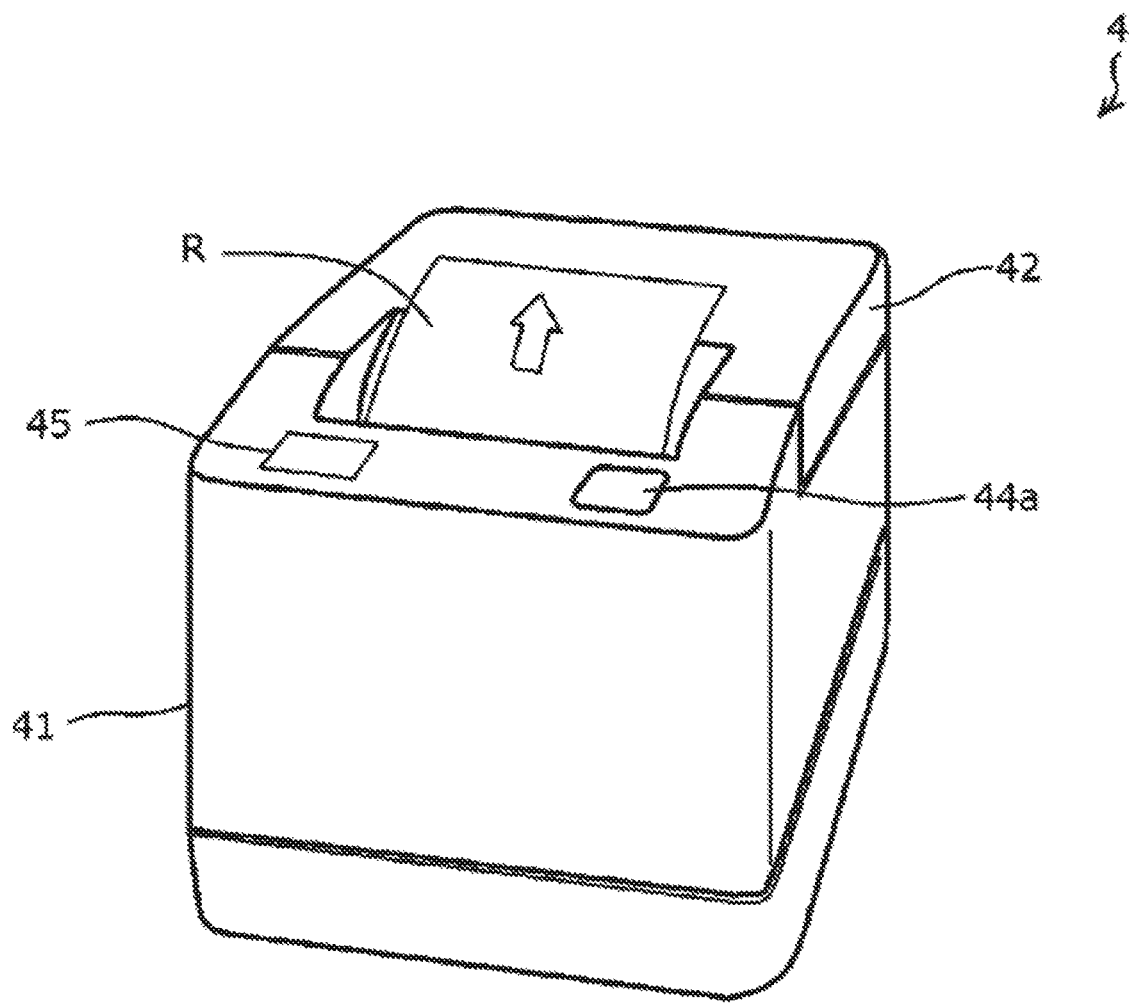
FIG. 2 is a perspective view illustrating an external appearance of a POS printer according to the first embodiment.
Figure 3:
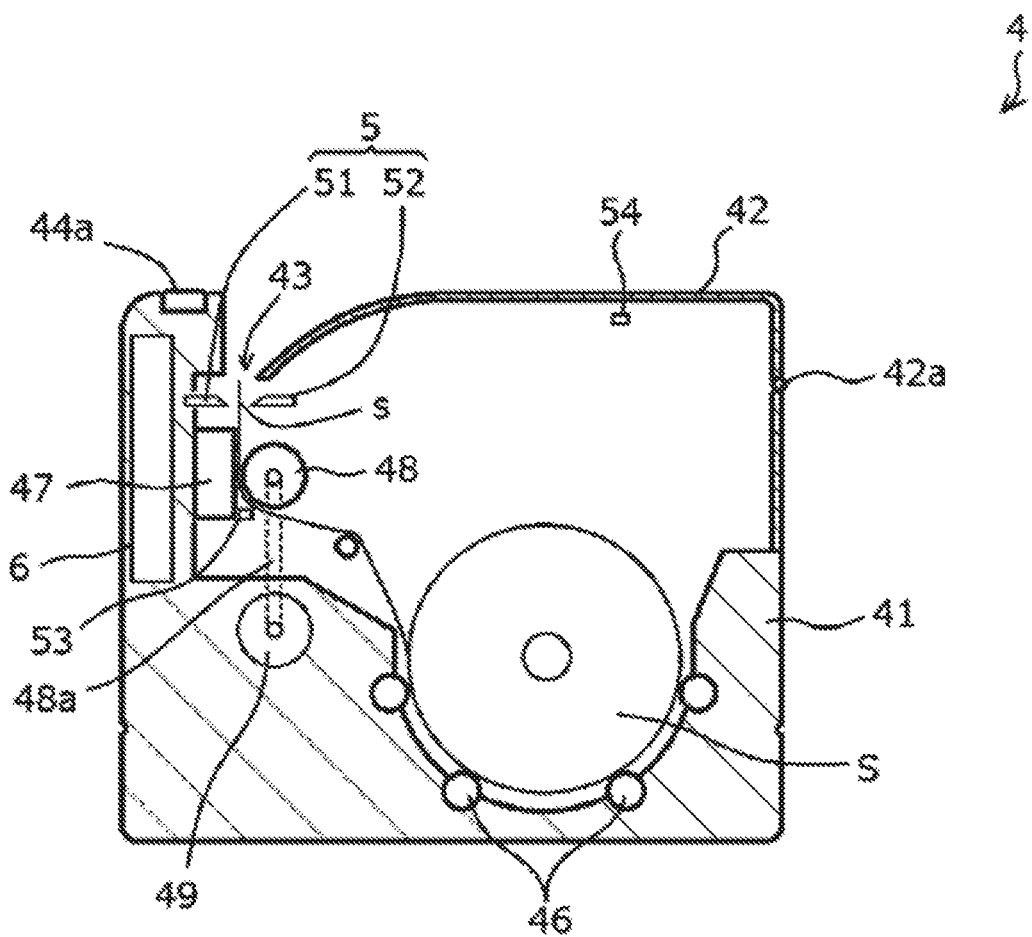
FIG. 3 is a cross-sectional view illustrating the POS printer according to the first embodiment as viewed from a side surface side.
Figure 4:
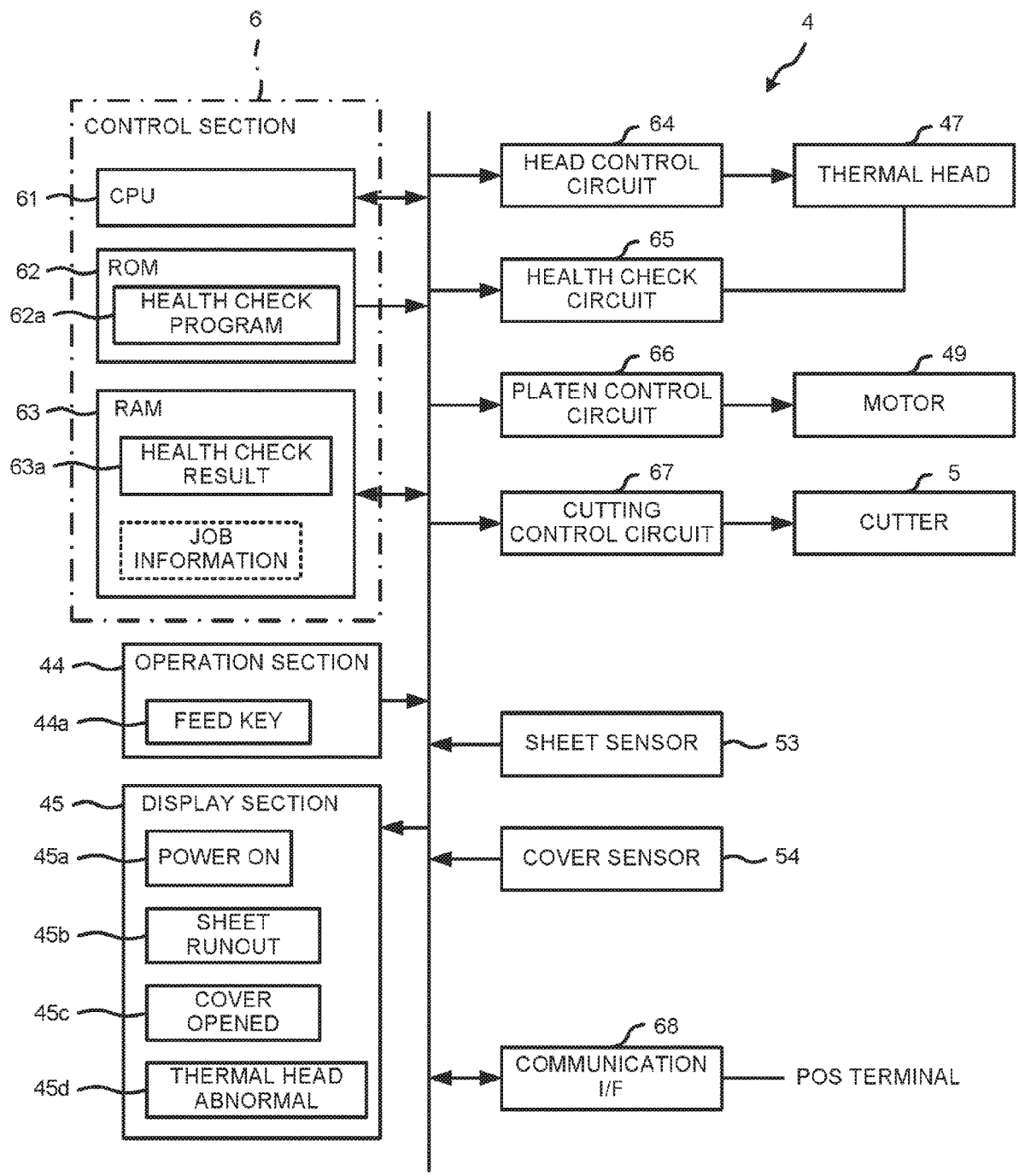
FIG. 4 is a diagram illustrating a block configuration of the POS printer according to the first embodiment.
Figure 5:
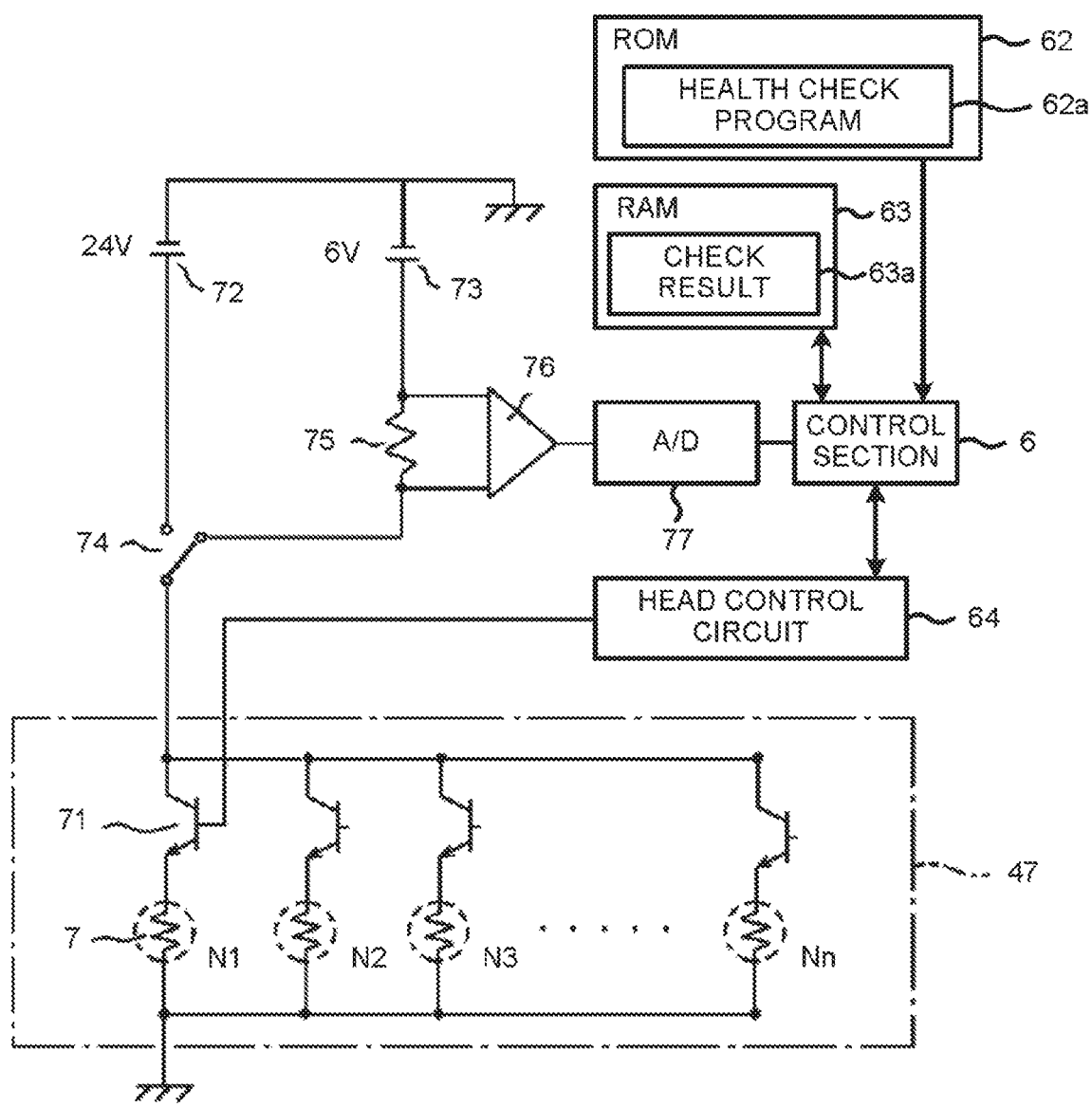
FIG. 5 is a diagram illustrating an electric system of the POS printer according to the first embodiment.

The POS printer 4 is described below with reference to FIG. 2 to FIG. 5. FIG. 2 is a perspective view illustrating an external appearance of the POS printer 4. FIG. 3 is a cross-sectional view of the POS printer 4 as viewed from a side surface side thereof. FIG. 4 is a diagram illustrating a block configuration of the POS printer 4. FIG. 5 is a diagram illustrating an electrical system for executing a printing processing and a health check processing.

As shown in FIG. 2 and FIG. 3 in particular, in the POS printer 4, an exterior body is formed by a main body 41 and a cover 42. In the POS printer 4, a discharge port 43 for discharging a printed receipt R is arranged at the top of the main body 41. Further, in the POS printer 4, a FEED key 44a which is an operation section and a display section 45 are arranged at the top of the main body 41. The cover 42 is openable and closable in a vertical direction with a horizontal shaft 42a provided on a back surface of the main body 41 as a support axis. The cover 42 is opened and closed, for example, when a roll-shaped sheet S is placed in the main body 41. The roll-shaped sheet S is an example of a printing medium on which the receipt R is printed. The roll-shaped sheet S is, for example, a thermal paper.

The roll-shaped sheet S is rotatably supported by a plurality of supporting rollers 46. The plurality of supporting rollers 46 is arranged in parallel with a central shaft of the roll-shaped sheet S, respectively. A front end of the sheet S drawn out from the roll is conveyed towards the discharge port 43. A thermal head 47 and a platen roller 48 are arranged in the middle of a conveyance path of the sheet S. The thermal head 47 is a print head in which heat generation elements for forming dots are arranged in a line, for example. The thermal head 47 is arranged in such a manner that a portion where the heat generation elements are arranged faces the platen roller 48 across the sheet S, and is biased towards the platen roller 48 by a biasing device (not shown) such as a spring.

In the platen roller 48, a portion in contact with the sheet S is made of a resin such as rubber. The platen roller 48 is connected to a motor 49 which is an example of a driving device via a power transmission device 48a such as a gear or a rotation belt. The motor 49 is, for example, a stepping motor. The platen roller 48 is rotated by a driving force from the motor 49. The thermal head 47 and the platen roller 48 perform printing on the sheet S by synchronizing a printing operation with a conveyance operation.

A cutter 5 for cutting the sheet S is arranged between the discharge port 43 and a printing section (sheet pinching section) formed by the thermal head 47 and the platen roller 48. The cutter 5 includes a fixed blade 51 and a movable blade 52. The movable blade 52 is movable forward and backward with respect to the fixed blade 51. The cutter 51 cuts a rear end of the printed sheet S by moving the movable blade 52 forward and backward.

A sheet sensor 53 for detecting the presence of the sheet S is arranged, for example, in front of the printing section (sheet pinching section) formed by the thermal head 47 and the platen roller 48. A cover sensor 54 for detecting the opening and closing of the cover 42 is arranged, for example, in the vicinity of the cover 42. The sheet sensor 53 and the cover sensor 54 are, for example, optical sensors.

A control section 6 for controlling the overall operation of the POS printer 4 is arranged in the main body 41. As shown in the block diagram in FIG. 4, the control section 6 includes a CPU (Central Processing Unit) 61, a ROM (Read Only Memory) 62 and a RAM (Random Access Memory) 63. The CPU 61, the ROM 62 and the RAM 63 are arranged on a circuit board, for example. The CPU 61 controls the overall operation of the POS printer 4. The ROM 62 stores various programs and various kinds of data. Various programs include a health check program 62a used for executing a health check processing on the thermal head 47. The health check program 62a is preferably stored in the ROM 62 as firmware. The RAM 63 stores various programs and various kinds of data, and rewrites data. The data stored in the RAM 63 includes information relating to a printing job received from the POS terminal 3, information relating to a health check result 63a for each heat generation element, and the like. The RAM 63 is preferably nonvolatile.

A head control circuit 64 controls the printing operation of the thermal head 47. The control section 6 generates control signals such as dot arrangement information of an image to be printed, a latch signal, a strobe signal and the like based on the information relating to the printing job received from the POS terminal 3, and then transmits the generated control signals to the head control circuit 64. A health check circuit 65 which is a health check section executes a health check of the thermal head 47. The control section 6 transmits a control signal to the health check circuit 65 to execute the health check processing on the thermal head 47 according to a flow described in detail below. A platen control circuit 66 controls operations of the motor 49 such as start and stop. The control section 6 transmits a control signal to the platen control circuit 66 to rotate the platen roller 48 in synchronization with the printing operation by the thermal head 47. A cutting control circuit 67 controls the operation of the cutter 5. The control section 6 transmits a control signal to the cutting control circuit 67 to cut the rear end of the sheet S after the printing is terminated.

The sheet sensor 53 detects whether or not there is a sheet S in front of the printing section (sheet pinching section) formed by the thermal head 47 and the platen roller 48. The control section 6 executes the printing operation if the sheet sensor 53 detects the sheet S, or transmits a "the sheet runs out" signal to the display section 45 without performing the printing operation if no sheet S is detected. The cover sensor 54 detects whether or not the cover 42 is closed. The control section 6 executes the printing operation if the cover sensor 54 detects that the cover is closed, or transmits a signal "the cover is open" to the display section 45 without performing the printing operation if the cover sensor 54 detects that the cover is opening.

An operation section 44 for operating the POS printer 4 includes the FEED key 44a. When a user presses the FEED key 44a, the control section 6 transmits a control signal to the platen control circuit 66 to rotate the platen roller 48 to feed the sheet S towards the discharge port 43. The display section 45 displays various statuses of the POS printer 4. The display section 45 includes an indicator lamp 45a for displaying a power ON state, an indicator lamp 45b for displaying that the sheet runs out, an indicator lamp 45c for displaying that the cover is open, and an indicator lamp 45d for displaying occurrence of abnormality in the thermal head according to a health check result. The display lamps 45a to 45d are, for example, LED (Light Emitting Diode) lamps.

A communication interface 68 is connected to the POS terminal 3. The communication interface 68 is connected to the POS terminal 3 via the communication cable 3a such as the USB cable, for example. The control section 6 performs communication such as data transmission and reception with the POS terminal 3 via the communication interface 68. However, the connection with the POS terminal 3 may be wireless connection rather than wired connection.

FIG. 5 is a diagram illustrating an electrical system for performing printing processing and executing the health check processing. The thermal head 47 has Nn (which is an integer) heat generation elements 7 arranged in a line shape in a width direction of the head. The heat generation element 7 is a resistance element which generates heat when supplied with electric power. Each heat generation element 7 constitutes a dot. The number of the heat generation elements 7 is set to be, for example, 200 to 300 dpi. Each of the heat generation elements 7 is connected to a transistor 71 for turning on and off the supply of electric power. The transistor 71 is, for example, an NPN type transistor 71. Furthermore, the heat generation element 7 is grounded via a common electrical wiring.

A printing power supply 72 for supplying the electric power to the heat generation element 7 at the time of executing a printing job, and a health check power supply 73 for supplying the electric power to the heat generation element 7 at the time of executing the health check processing are connected to collect terminals of the transistors 71, respectively. The printing power supply 72 is, for example, a power supply of 24 volts. The health check power supply 73 is, for example, a power supply of 6 volts. The health check power supply 73 is a power supply of a voltage at which the sheet S does not develop color due to the heat generated by the heat generation element 7. The electric power for printing and the electric power for health check are switched by a switch 74. The switch 74 is operated according to a control signal from the control section 6.

A resistor 75 is connected to a power supply line for health check. Furthermore, a voltage detection circuit 76 for detecting a voltage value E1 applied to the resistor 75 is connected to the power supply line for health check. The voltage detection circuit 76 is, for example, a differential voltage detection circuit. The voltage detection circuit 76 is connected to an A/D (analog/digital) conversion circuit 77 that converts a detection result into a digital signal. An amplifier may be provided between the voltage detection circuit 76 and the A/D conversion circuit 77. The A/D conversion circuit 77 is further connected to the control section 6. Specifically, the control section 6 detects the voltage value E1 of the resistor 75 when the electric power for health check is supplied to the heat generation element 7, and further detects a voltage value E2 of the heat generation element 7, for example, by calculation. The control section 6 determines that the heat generation element 7 is disconnected if the voltage value E1 of the resistor 75 is 0 (zero). If the voltage value E2 of the heat generation element 7 is beyond an allowable range although the heat generation element 7 is connected, the control section 6 determines that an abnormality occurs in the heat generation element 7. For example, the allowable range is set as a range of ±1 V with an initial voltage value at the time of manufacture of the thermal head set as a reference value. The reference value may be an average voltage value obtained by measuring a total voltage value of the entire Nn heat generation elements and dividing the total voltage value by Nn (which is an integer). The health check power supply 73, the resistor 75, the voltage detection circuit 76 and the A/D conversion circuit 77 constitutes an example of the health check circuit 65.

The head control circuit 64 internally includes a shift register circuit, a latch circuit and an output gate circuit (none is shown), wherein the number of each of them is equal to the number (Nn) of the heat generation elements 7. The shift register circuit, the latch circuit and the output gate circuit are connected in series. An output terminal of the output gate circuit is connected to a base terminal of the transistor 71. At the time of enabling a specific heat generation element 7 among Nn heat generation elements 7 to generate heat, the head control circuit 64 inputs a 1/0 signal to the shift register circuit in synchronization with a clock signal. For example, a signal of "1" is input to a shift register circuit connected to the heat generation element 7 required to generate heat, and a signal of "0" is input to a shift register circuit connected to the heat generation element 7 that is not required to generate heat.

The head control circuit 64 transfers a signal held by the shift register circuit to the latch circuit at the timing at which the control section 6 transmits the latch signal. The latch circuit raises a signal to be output to the output gate circuit to a high level when a signal is transferred from the shift register circuit. Then, the output gate circuit turns on the transistor 71 while both the signal from the latch circuit and a strobe signal transmitted from the control section 6 are at the high level. Thereby, the electric power is supplied to the heat generation element 7 to which the 1/0 signal of "1" is input among Nn heat generation elements 7.

Therefore, when a printing job is executed, the control section 6 divides the image to be printed into a plurality of lines, and sequentially transmits dot data of each line to the head control circuit 64. The head control circuit 64 inputs the 1/0 signal based on the dot data of each line to the shift register circuit. On the other hand, when the health check processing is executed, the head control circuit 64 inputs 1/0 signal, in which "1" is set for the heat generation element 7 to be checked and "0" is set for the other heat generation elements 7, to the shift register circuit.

Subsequently, the flow of the health check processing on the thermal head 47 is described with reference to the flowcharts in FIG. 6 and FIG. 7. For example, if the POS printer 4 and the POS terminal 3 are in the online state during business time of the retail store, and an idle state (standby state) in which no printing job is being executed continues, the control section 6 determines whether or not the idle state continues for a set time period (Act 10). If the idle state continues for the set time period (Yes in Act 10), the control section 6 executes the health check program 62a in the background to start the health check processing (Act 11). The set time period is, for example, 10 minutes. Upon starting the health check processing, the control section 6 operates the switch 74 to switch the power supply line from the printing power supply 72 to the health check power supply 73.

The health check of the heat generation element 7 is performed for Nn heat generation elements 7 one by one, for example. The control section 6 performs the health check of the heat generation element 7 to be checked (Act 12). For example, a checking order is ascending from the first (N1) heat generation element 7 at one end side towards the Nn-th heat generation element 7 at the other end side. Of course, the order is not limited to this. For example, when the health check is executed for the first time after turning on the power supply of the POS printer 4, it is assumed that the first (N1) heat generation element 7 is the heat generation element 7 to be checked.

Figure 7:
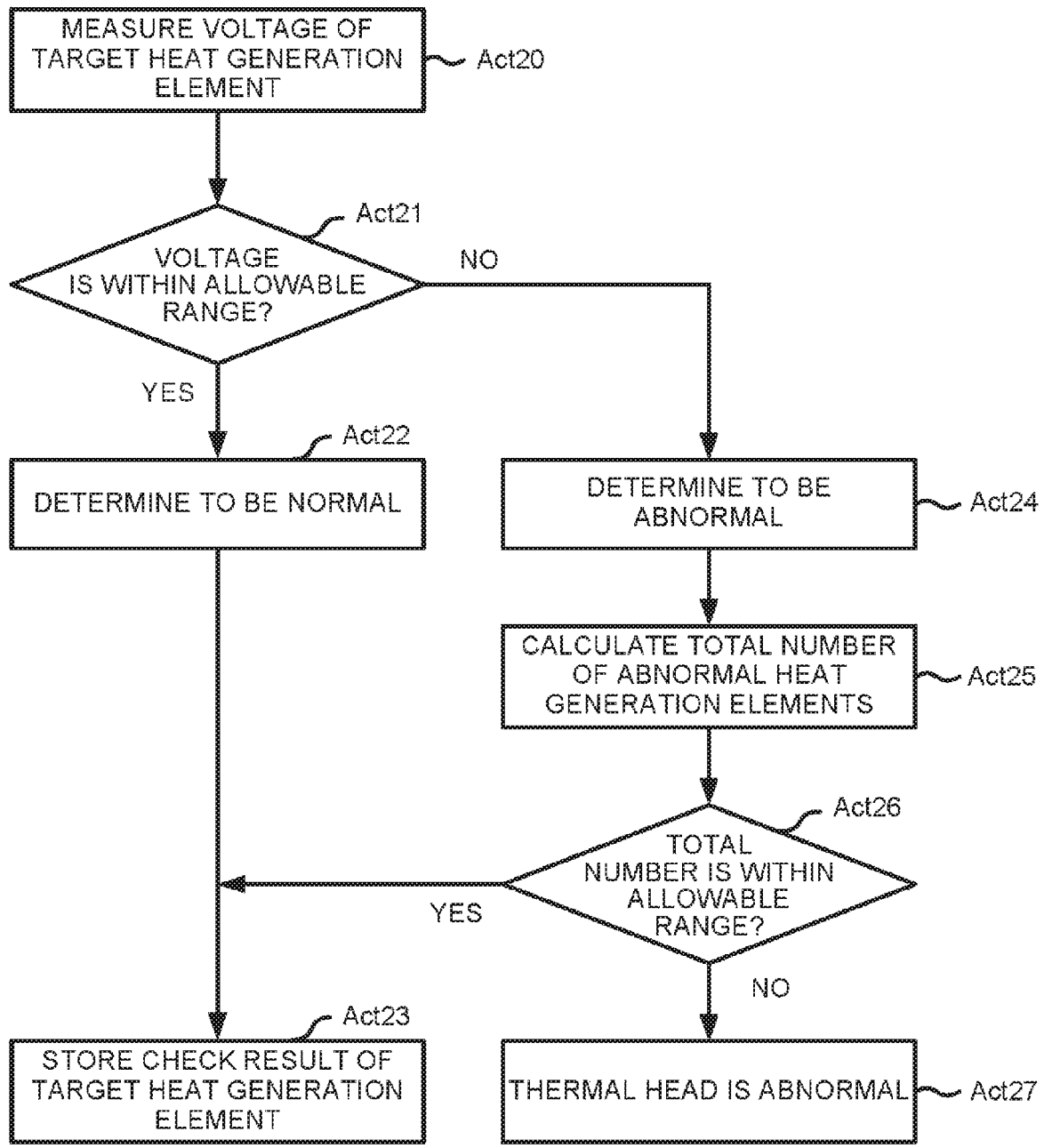
FIG. 7 is a flowchart depicting a health check processing executed by the POS printer according to the first embodiment.

As shown in FIG. 7, the control section 6 supplies the electric power for health check to the first (N1) heat generation element 7 to be checked, and receives the voltage value E1 of the resistor 75 detected by the voltage detection circuit 76. Furthermore, the control section 6 calculates the voltage value E2 of the heat generation element 7 by calculation from the voltage value E1 of the resistor 75 (Act 20). The supply of the electric power for health check is performed, for example, about 1.2 msec so that the voltage value E1 of the resistor 75 and the voltage value E2 of the heat generation element 7 are stabilized. The control section 6 determines whether the voltage value E2 of the heat generation element 7 is within the allowable range or beyond the allowable range (Act 21). For example, if the calculated voltage value E2 of the heat generation element is beyond the range of, for example, the reference value ±1 V, it is determined that the voltage value E2 of the heat generation element 7 is beyond the allowable range. When the voltage value E1 of the resistor 75 is 0 (zero), since the heat generation element 7 is disconnected, the voltage value E2 of the heat generation element 7 surely falls beyond the allowable range.

If the voltage value E2 of the heat generation element 7 is within the allowable range (Yes in Act 21), the control section 6 determines that the first (N1) heat generation element 7 is normal (Act 22), and stores the result "first (N1) heat generation element 7, voltage value (V), normal" in the RAM 63 as the health check result 63a (Act 23).

On the other hand, if the voltage value E2 of the heat generation element 7 is beyond the allowable range (No in Act 21), the control section 6 determines that the first (N1) heat generation element 7 is abnormal (Act 24). In other words, the first (N1) heat generation element 7 is disconnected or in a nearly disconnected state. In this case, the control section 6 calculates the total number of the heat generation elements 7 determined to be abnormal, and stores it in the RAM 63 as the health check result 63a (Act 25). Furthermore, the control section 6 determines whether or not the total number of the heat generation elements 7 determined to be abnormal is within an allowable range (Act 26). The allowable range is, for example, within a few percent of the total number of the heat generation elements 7. If the total number is within the allowable range (Yes in Act 26), the control section 6 stores the result "first (N1) heat generation element 7, voltage value (V), abnormal" in the RAM 63 as the health check result 63a (Act 23). For example, if the total number of the heat generation elements 7 determined to be abnormal exceeds the allowable range due to continuous use of the thermal head 47 (No in Act 26), the control section 6 turns on the indicator lamp 45d indicating occurrence of abnormality of the thermal head 48 and provided in the display section 45 since the thermal head 47 no longer performs normal printing (Act 27). In this case, the thermal head 47 needs to be replaced or repaired.

Figure 6:
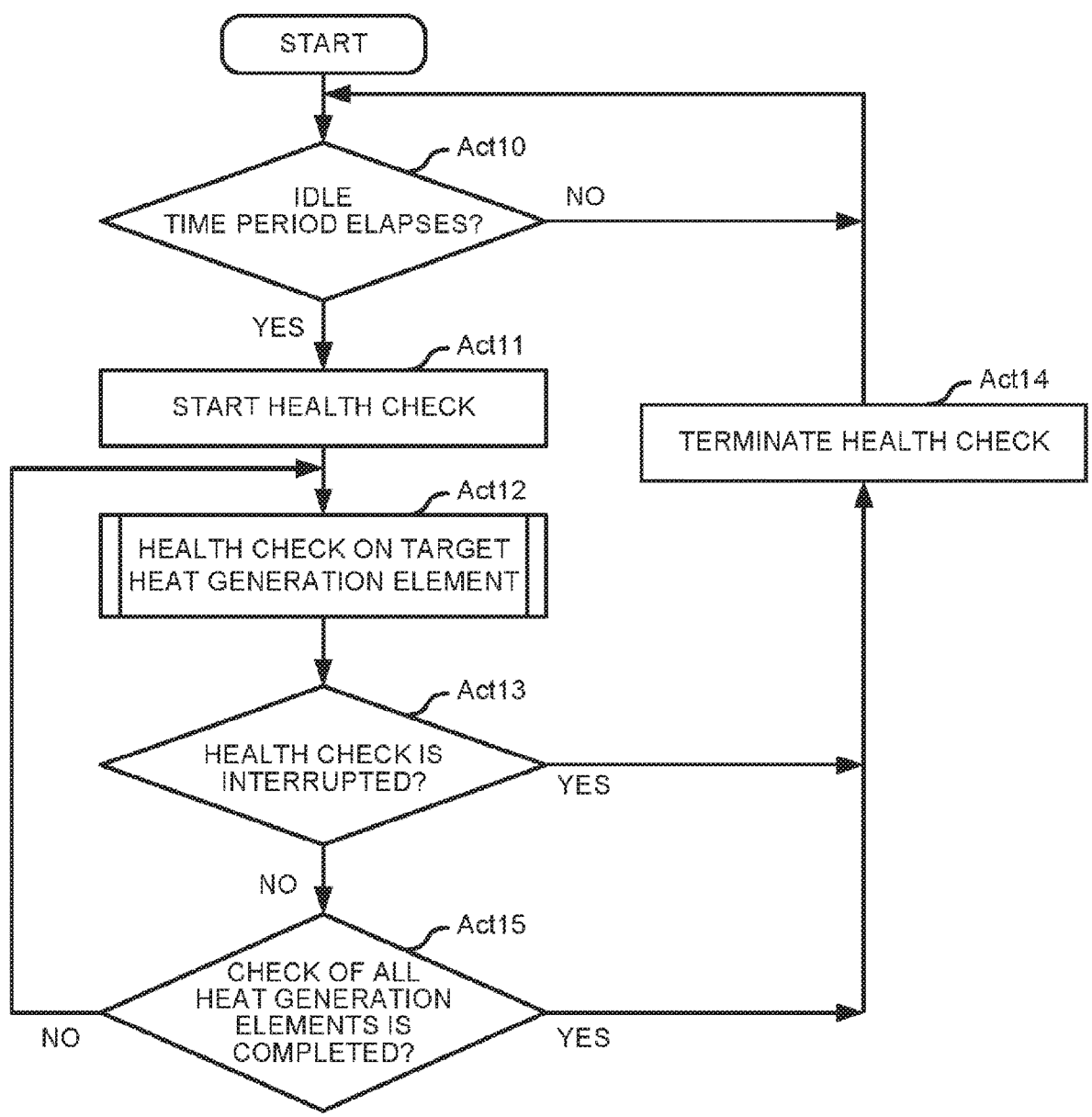
FIG. 6 is a flowchart depicting a health check processing executed by the POS printer according to the first embodiment.

Returning to the explanation of FIG. 6, if the control section 6 starts executing the health check for the second (N2) heat generation element 7, but a cause that interrupts the health check processing occurs (Yes in Act 13), the control section 6 interrupts the health check processing. The cause that interrupts the health check processing is typically a request for printing from the POS terminal 3.

If the health check processing is interrupted upon receiving a printing request from the POS terminal 3 (Yes in Act 13), the control section 6 controls the head control circuit 64 to turn off the transistor 71 and operates the switch 74 to switch the power supply line from the health check power supply 73 to the printing power supply 72 (Act 14). Then, the control section 6 executes the printing based on information relating to the printing job received from the POS terminal 3. Thereafter, if the idle state in which the printing job is not executed again continues for a set time period (Yes in Act 10), the control section 6 again executes the health check program 62a in the background to restart the health check processing.

Although not described in the above description, if the health check processing is started, the control section 6 refers to the information of the health check result 63a stored in the RAM 63, for example, to confirm the heat generation element 7 of which the previous health check is finished. In the above description, the health check of the first (N1) heat generation element 7 is terminated, but the health check of the second (N2) heat generation element 7 is not terminated yet. Since the checking order is the ascending order, the control section 6 sets the second (N2) heat generation element 7 as the heat generation element 7 to be checked (Act 12).

When the health check is executed in the ascending order as described above (No in Act 15), if the health check of the Nn-th heat generation element 7 is terminated (Yes in Act 15), the control section 6 terminates the health check processing since the health check of all the heat generation elements 7 is terminated (Act 14). Thereafter, when the idle state in which no printing job is executed again continues for the set time period, the control section 6 executes the health check of all the Nn heat generation elements 7 for the second time. The health check processing is repeated in the background if the power supply of the POS printer 4 is turned on. If the RAM 63 is nonvolatile, the information indicating the health check result remains even if the power supply is turned off, but if the power supply is turned off, the next health check processing is executed from the initial first (N1) heat generation element 7. Of course, the previous health check processing may be continuously executed.

As described above, the POS printer 4 of the first embodiment executes the health check processing in the background by setting the idle state (waiting state) continuing for the set time period as a trigger. Then, if the interruption cause such as reception of a print request from the POS terminal 3 occurs, the health check processing is interrupted and the health check of the remaining heat generation elements 7 is performed in the next health check processing. Therefore, according to the POS printer 4 of the first embodiment, it is possible to automatically perform the health check processing on the plurality of the heat generation elements 7 provided in the thermal head 47 in the on-line state. For example, if there is a request from the POS terminal 3, the POS printer 4 transmits the health check result.

Second Embodiment

Figure 8:
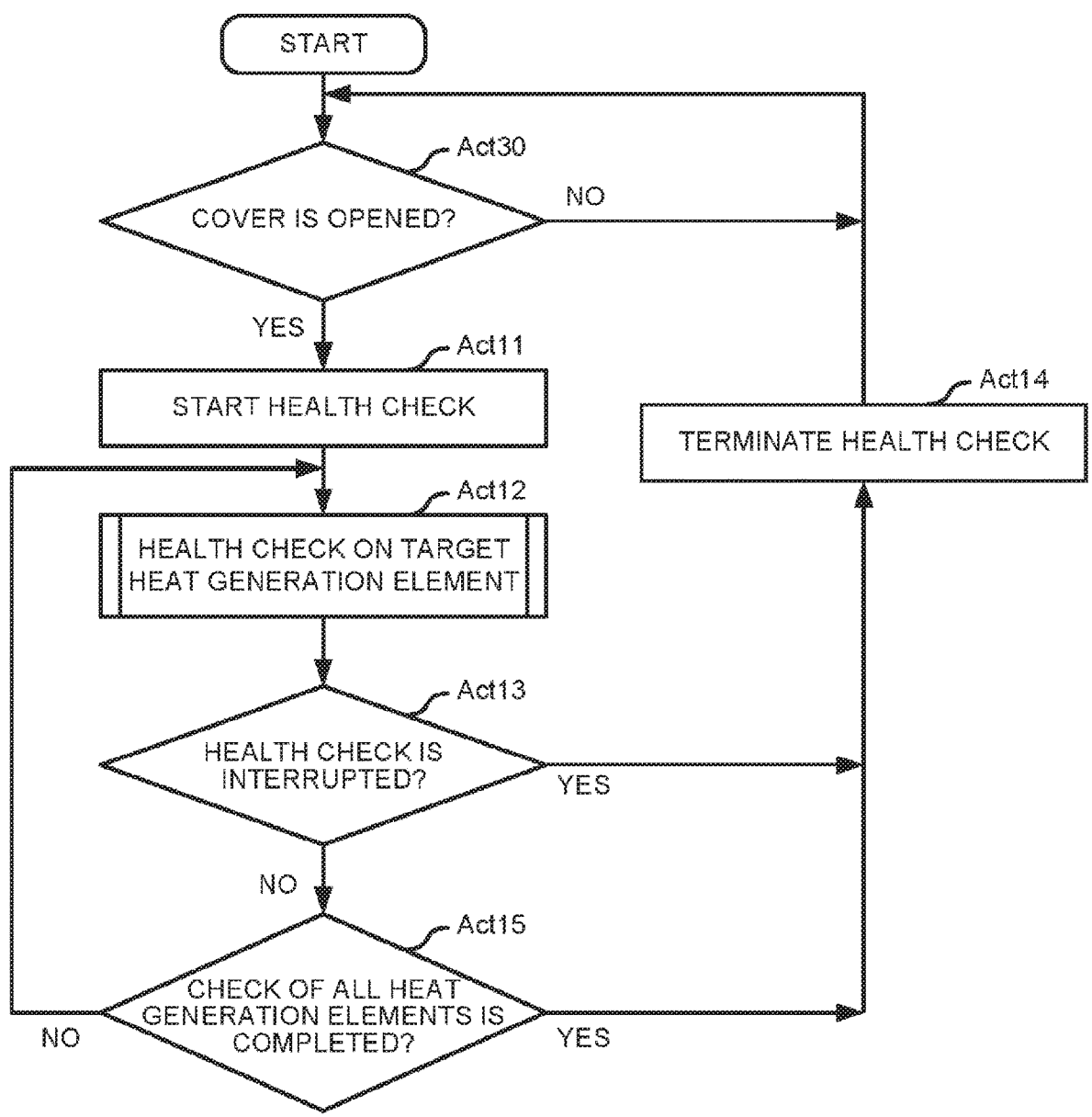
FIG. 8 is a flowchart depicting a health check processing executed by a POS printer according to a second embodiment.

Subsequently, a modification of the health check processing is described. FIG. 8 is a flowchart depicting a health check processing executed by the POS printer 4 according to the second embodiment. The POS printer 4 of the second embodiment is the same as the POS printer 4 of the first embodiment except that the trigger for starting the health check processing is different. In other words, it has the same configuration as that shown in FIG. 1 to FIG. 5.

The POS printer 4 of the second embodiment sets the opening and closing of the cover 42 as a trigger for starting the health check processing. Specifically, for example, when the cover sensor 54 detects that the cover 42 is opened while the POS printer 4 and the POS terminal 3 are in the online state during business time of the retail store, the control section 6 executes the health check program 62a in the background to start the health check processing (Act 30). The cover 42 is typically opened when placing a new roll-shaped sheet S in the main body 41. Of course, the cover 42 may be opened for other reasons.

Upon starting the health check processing, the control section 6 performs the health check processing on the Nn heat generation elements 7 one by one in order. Since the flow of the health check is the same as that of the first embodiment, the same reference numerals are denoted and the detailed description thereof is omitted (Act 11 to 15). Although the cover 42 is closed after the placement of the new roll-shaped sheet S is completed, the closing of the cover 42 may not belong to the cause for interrupting the health check processing. Specifically, if there is no interruption cause such as receiving a print request from the POS terminal 3, the control section 6 continues the health check processing even when the cover 42 is closed.

As described above, the POS printer 4 of the second embodiment executes the health check processing in the background by setting the opening of the cover 42 as a trigger. Then, if the interruption cause such as receiving a print request from the POS terminal 3 occurs, the health check processing is interrupted and the health check of the remaining heat generation elements 7 is performed in the next health check processing. Therefore, according to the POS printer 4 of the second embodiment, it is possible to automatically perform the health check of the plurality of the heat generation elements 7 provided in the thermal head 47 in the online state.

In the first embodiment, the idle time is set as the trigger, and in the second embodiment, the opening of the cover 42 is set as the trigger to start the health check processing. However, the trigger is not limited thereto, and both may be set as the trigger. For example, when the health check processing triggered by the idle time is interrupted, the health check processing may be resumed in response to the opening of the cover 42 as the trigger.

Furthermore, the trigger to start the health check processing is not limited to the idle time and the opening of the cover 42. As another example, the trigger may be, for example, when the sheet sensor 53 detects that the sheet runs out. This is because the cover 42 is opened to place a new roll-shaped sheet S. In other words, any trigger may be set as long as the health check processing can be executed while no printing job is being executed.

In the first embodiment and the second embodiment, the POS printer 4 is described as an example of the thermal printer, but the thermal printer is not limited to the POS printer 4. Furthermore, the image forming apparatus according to the embodiment may be a device other than a printer as long as it includes a thermal head for forming an image.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a thermal head including a plurality of heat generation elements and configured to form an image on a sheet using heat generated by the plurality of heat generation elements;
a health check component configured to diagnose conditions of the plurality of heat generation elements; and
a control component configured to control the health check component to execute a health check processing when the thermal head is not executing a job of forming an image and diagnose conditions of remaining heat generation elements in a next health check processing when the health check processing is interrupted, wherein
the control component controls the health check component to execute a health check processing when standby time for waiting for a job reaches or exceeds a set time period.

2. The image forming apparatus according to claim 1, wherein
the control component controls the health check component to execute a health check processing when a cover of the image forming apparatus is in an open state.

3. The image forming apparatus according to claim 1, wherein
the control component stores a program for executing a health check processing as firmware, and executes the health check processing in background processing.

4. The image forming apparatus according to claim 1, wherein
the control component displays a result of the health check processing executed in the background processing on a display.

5. The image forming apparatus according to claim 1, wherein
the health check component is configured to diagnose conditions of the plurality of heat generation elements by detecting a voltage value of the plurality of heat generation elements.

6. The image forming apparatus according to claim 1, wherein
the control component is further figured to compare a voltage value of the plurality of heat generation elements to a reference value.

7. A diagnostic method, comprising:
diagnosing conditions of a plurality of heat generation elements of a thermal head when the thermal head is not executing a job of forming an image;
stopping diagnosing conditions of the plurality of heat generation elements of the thermal head when the thermal head starts executing the job of forming an image;
diagnosing conditions of remaining heat generation elements when the thermal head is again not executing the job of forming an image; and
diagnosing conditions of a plurality of heat generation elements when standby time for waiting for a printing job reaches or exceeds a set time period.

8. The diagnostic method according to claim 7, further comprising:
diagnosing conditions of a plurality of heat generation elements when a cover of an apparatus comprising the thermal head is in an open state.

9. The diagnostic method according to claim 7, further comprising:
displaying a result of the diagnosing conditions on a display.

10. The diagnostic method according to claim 7, wherein diagnosing conditions of the plurality of heat generation elements comprises detecting a voltage value of the plurality of heat generation elements.

11. The diagnostic method according to claim 7, wherein diagnosing conditions of a plurality of heat generation elements comprises comparing a voltage value of the plurality of heat generation elements to a reference value.

12. An image forming apparatus, comprising:
a thermal head including a plurality of heat generation elements and configured to form an image on a sheet using heat generated by the plurality of heat generation elements;
a health check component configured to diagnose conditions of the plurality of heat generation elements; and
a control component configured to control the health check component to execute a health check processing when the thermal head is not executing a job of forming an image and diagnose conditions of remaining heat generation elements in a next health check processing when the health check processing is interrupted, wherein the control component controls the health check component to execute a health check processing when a cover of the image forming apparatus is in an open state.

13. The image forming apparatus according to claim 12, wherein
the control component controls the health check component to execute a health check processing when standby time for waiting for a job reaches or exceeds a set time period.

14. The image forming apparatus according to claim 12, wherein
the control component stores a program for executing a health check processing as firmware, and executes the health check processing in background processing.

15. The image forming apparatus according to claim 12, wherein
the control component displays a result of the health check processing executed in the background processing on a display.

16. A diagnostic method, comprising:
diagnosing conditions of a plurality of heat generation elements of a thermal head when the thermal head is not executing a job of forming an image;
stopping diagnosing conditions of the plurality of heat generation elements of the thermal head when the thermal head starts executing the job of forming an image;
diagnosing conditions of remaining heat generation elements when the thermal head is again not executing the job of forming an image; and
diagnosing conditions of a plurality of heat generation elements when a cover of an apparatus comprising the thermal head is in an open state.

17. The diagnostic method according to claim 16, further comprising:
diagnosing conditions of a plurality of heat generation elements when standby time for waiting for a printing job reaches or exceeds a set time period.

18. The diagnostic method according to claim 16, further comprising:
displaying a result of the diagnosing conditions on a display.

19. The diagnostic method according to claim 16, wherein
diagnosing conditions of the plurality of heat generation elements comprises detecting a voltage value of the plurality of heat generation elements.

20. The diagnostic method according to claim 16, wherein
diagnosing conditions of a plurality of heat generation elements comprises comparing a voltage value of the plurality of heat generation elements to a reference value.

* * * * *